(Model.)

C. W. WEISS.
VALVE.

No. 556,037.  Patented Mar. 10, 1896.

Attest:
A. N. Jesbera.
S. H. Irish.

Inventor:
Carl W. Weiss
by Redding & Kiddle
Attys.

UNITED STATES PATENT OFFICE.

CARL W. WEISS, OF NEW YORK, N. Y., ASSIGNOR TO HIMSELF AND AUGUST MIETZ, OF SAME PLACE.

VALVE.

SPECIFICATION forming part of Letters Patent No. 556,037, dated March 10, 1896.

Application filed April 27, 1895. Serial No. 547,302. (Model.)

*To all whom it may concern:*

Be it known that I, CARL W. WEISS, a citizen of the United States, residing in the city, county, and State of New York, have invented certain new and useful Improvements in Valves, of which the following is a specification, reference being had to the accompanying drawings, forming a part hereof.

This invention relates to the construction of valves or valve-seats, and has for its object to produce a valve which in the severest use, such as that, for example, to which valves of explosive engines or high-pressure steam engines or pumps are subjected, shall be quiet in action and shall possess greater durability and effectiveness than the valves now commonly used. To this end the valve-plug or valve-seat is made up of a number of thin plates or laminæ of metal which, although resting upon one another and, it may be, held together with some pressure, nevertheless spring or yield sufficiently to permit the valve after every movement to close quietly and at the same time to make a tight closure.

Several forms wherein the invention may be embodied will be more particularly described hereinafter with reference to the accompanying drawings, in which—

Figure 1:
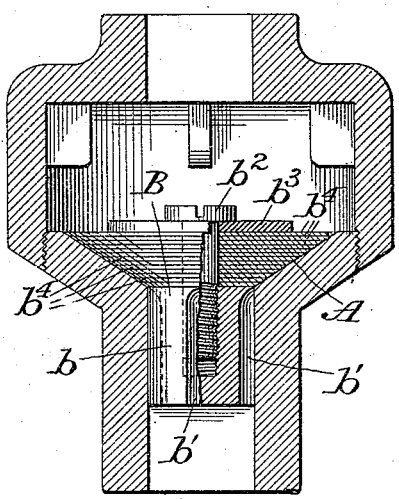
Figure 2:
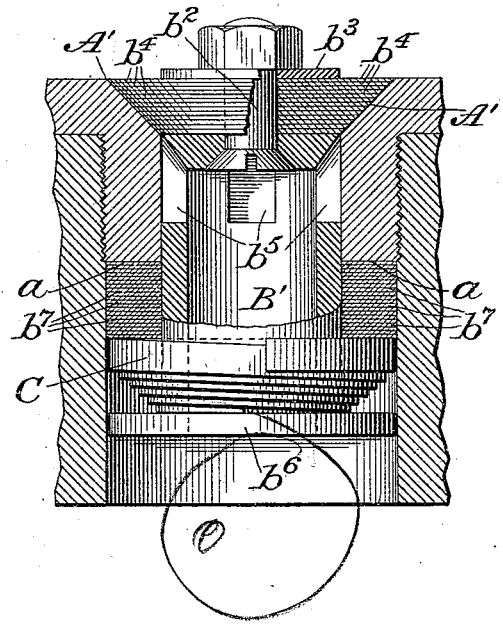
Figure 4:
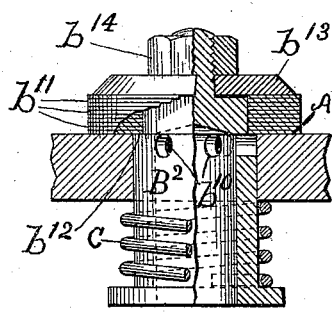
Figure 3:
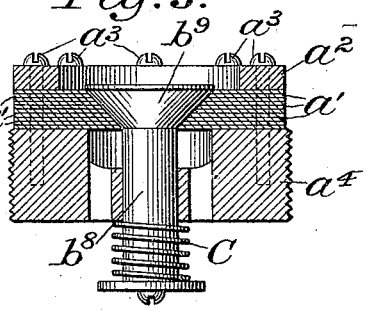

Figure 1 is a view in vertical central section through a valve constructed in accordance with this improvement, the valve-plug being shown partly in elevation. Fig. 2 is a similar view of a different form of valve embodying the invention. Fig. 3 is a similar view of still another form of valve, the valve-plug being wholly in elevation, and the view illustrating the application of the particular feature of the improvement to the valve-seat. Fig. 4 is a similar view having a different relative arrangement of the valve plug and seat.

Referring first to the construction shown in Fig. 1, the valve-seat A is formed as usual, its surface being smooth and being tapered inwardly. The valve-plug B, as shown in said figure, consists of a stem or body $b$ entering freely the tubular portion of the valve-seat and having, it may be, grooves $b'$ $b'$ to permit the passage of the steam, gas, or other fluid when the plug is raised slightly from its seat. To the stem or body $b$ are secured by any suitable means, as by a screw $b^2$ and washer $b^3$, a series of separate and independent laminæ or thin sheets $b^4$ of metal.

The laminæ are made of spring-steel or spring-brass or analogous material of such density or hardness as to resist indentation and capable of withstanding high temperatures, but of sufficient thinness to avoid rigidity in each lamina independently considered. They may be practically flat, and indeed preferably are so, and they may lie upon one another and be pressed more or less closely together by tightening of the screw $b^2$.

The stem or body and the laminæ, in the particular form here referred to, having been assembled are put into a lathe and the edges of the laminæ turned down to form a practically-continuous bearing-surface conforming exactly to the surface of the seat. They thus form a plug which for certain purposes is virtually solid, and yet by reason of the fact that it is made up of independent laminæ which are not actually in physical contact throughout the entire area of their adjacent surfaces the plug is elastic and its bearing-surface has a certain degree of elasticity which cushions the plug as it finds its seat and thereby increases the durability of the valve and avoids almost entirely the noise which is made under like conditions of use by the ordinary valve. Furthermore, it is a fact demonstrated by practical experience that with the form shown the presence between a plug and its seat of a particle of solid matter, which would cause an ordinary valve to leak, has no such effect upon the improved valve, the surface of the valve yielding sufficiently to prevent the lifting or tilting of the plug as a whole. The plug or body may be made more elastic, as required, by separating the laminæ slightly, as by reducing the diameter of alternate laminæ or by corrugating the laminæ.

The application of the same principle is illustrated in Fig. 2 in a valve of somewhat different form, the application of the principle being also carried somewhat further. The valve-seat A' may be formed as before, and the independent laminæ $b^4$ may be secured substantially as before by a bolt $b^2$ and washer $b^3$ to the body B', which in this case is tubular and has ports $b^5$, which, when the valve-plug rises, themselves rise above the lower edge of the seat to permit the escape of the gas or other fluid. The lower end of the body B' has a flange $b^6$, which serves as a stop to prevent the lifting of the valve-plug entirely out of its seat, the said seat having a shoulder $a$ to co-operate with the flange or projecting rim $b^6$. Violent contact of this rim or flange with the seat would occasion noise, and I therefore interpose between them a series of annular laminæ $b^7$, which are fitted around the body B' and within the chamber in which the valve-seat is fixed. For the further purpose of returning the valve-plug to its seat I interpose also between the shoulder $a$ and the projecting rim or flange $b^6$ a spring C, the coils of which slip one within the other as the valve-plug is lifted from its seat.

It is obvious that results substantially identical with those secured by the use of the valve above described would also be obtained by using a solid plug with a laminated seat, and that such construction would be substantially equivalent for that in which the laminated plug is used with a solid seat. This equivalent construction or arrangement I have illustrated in Fig. 3, in which the stem $b^8$ carries a solid tapering plug $b^9$, while the valve-seat is made up of a series of independent laminæ $a'$, which are secured by any suitable means, as by a ring $a^2$ and bolts or screws $a^3$ to the ring $a^4$, which forms the body or support of the seat, the said ring $a^4$ having an aperture of greater diameter than the aperture through the valve-seat, whereby the laminæ are free to yield at their margins as the valve-plug comes to its seat. In constructing this form of the valve the laminæ are secured to the ring $a^4$ and are then placed in a lathe or subjected to the action of any other suitable tool to form the seat in the laminæ with a uniformly-tapering and practically-continuous surface.

In the forms represented in Figs. 1, 2 and 3 the valve-plug and valve-seat are tapered or conical. It is obvious, however, that the principle of the invention is equally applicable to other forms of valves, such, for example, as that shown in Fig. 4, in which the plane of contact between the valve-plug and its seat is flat. In the construction there shown the body $B^2$ is tubular and has ports $b^{10}$ which may rise above the seat to permit the escape of the gas or other fluid. The laminæ $b^{11}$ may be secured to the body of the plug by any suitable means, as between a shoulder $b^{12}$ formed on the body and a washer $b^{13}$ and nut $b^{14}$. The valve-seat A is flat and the under surface of that portion of the plug formed by the laminæ bears directly on the seat. As the valve comes to its seat it is obvious that the blow will be cushioned by the elasticity or yielding character of the body which is made up of independent and elastic laminæ. A spring C is represented as interposed between the wall of the valve-seat and a flange on the body $B^2$ for the purpose of holding the plug normally against its seat.

It will be understood that although I have herein shown and described my invention as embodied in certain practical forms, nevertheless I do not intend thereby to restrict the invention to any particular form or construction, nor to any particular kind or class of valves.

What I claim, and desire to secure by Letters Patent, is—

1. The herein-described valve, the same having a series of independent and hard but elastic metallic laminæ secured together to form a practically solid but elastic body whereby the valve is cushioned as it closes.

2. A valve having a stem or body and a series of independent and hard but elastic metallic laminæ secured together to said stem or body to form a practically solid but elastic body whereby the valve is cushioned as it closes.

3. In a valve, the combination with a valve-seat and a valve-plug having a stem or body with a projecting rim, of independent and elastic metallic laminæ interposed between said projecting rim and a shoulder of the valve-seat, substantially as shown and described.

4. The herein-described valve, the same having a series of independent and hard but elastic metallic laminæ secured together and having their edges tapered to form a practically-continuous but somewhat-yielding bearing-surface, substantially as shown and described.

5. A valve having a stem or body and a series of independent and hard but elastic metallic laminæ secured one upon another to said stem with their edges turned off to form a tapering and practically-continuous but somewhat-yielding bearing-surface, substantially as shown and described.

This specification signed and witnessed this 24th day of April, A. D. 1895.

CARL W. WEISS.

In presence of—
  W. B. GREELEY,
  S. H. IRISH.